United States Patent
Honji

(10) Patent No.: US 9,235,340 B2
(45) Date of Patent: Jan. 12, 2016

(54) MODAL TOUCH INPUT

(75) Inventor: Scott Robert Honji, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 446 days.

(21) Appl. No.: 13/031,030

(22) Filed: Feb. 18, 2011

(65) Prior Publication Data

US 2012/0212421 A1     Aug. 23, 2012

(51) Int. Cl.
*G06F 3/041*     (2006.01)
*G06F 3/0488*     (2013.01)

(52) U.S. Cl.
CPC .......... *G06F 3/04883* (2013.01); *G06F 3/0414* (2013.01); *G06F 3/0416* (2013.01); *G06F 2203/04106* (2013.01); *G06F 2203/04808* (2013.01)

(58) Field of Classification Search
USPC .......... 345/173–178; 178/18.01–18.09, 18.11
See application file for complete search history.

(56) References Cited

U.S. PATENT DOCUMENTS

| | | | |
|---|---|---|---|
| 6,107,997 A | 8/2000 | Ure | |
| 2008/0029691 A1 | 2/2008 | Han | |
| 2008/0162996 A1* | 7/2008 | Krah | ...................... G06F 1/3203 714/27 |
| 2009/0273579 A1 | 11/2009 | Zachut et al. | |
| 2010/0245260 A1* | 9/2010 | Louch | ...................... G06F 3/038 345/173 |
| 2010/0299635 A1* | 11/2010 | Oh | ...................... G06F 3/04883 715/811 |

OTHER PUBLICATIONS

Moscovich, Tomer, "Multi-touch Interaction", Retrieved at << http://www.moscovich.net/tomer/papers/multi-touch-CHI-DC.pdf >>, CHI, Apr. 22-27, 2006, p. 1-4.
"Multi-Touch Interaction Research", Retrieved at << http://cs.nyu.edu/~jhan/ftirtouch/ >>, Jan. 2007, pp. 5.
Kosara, Robert, "The Magic of Indirect Multi-Touch Interaction", Retrieved at << http://eagereyes.org/blog/2010/the-magic-of-indirect-multi-touch-interaction >>, Aug. 4, 2010, pp. 4.
"What is Microsoft Surface?", Retrieved at << http://www.microsoft.com/surface/en/us/Pages/Product/WhatIs.aspx >>, Retrieved Date: Nov. 16, 2010, pp. 2.

(Continued)

*Primary Examiner* — Charles Hicks
*Assistant Examiner* — Jeffrey S Steinberg
(74) *Attorney, Agent, or Firm* — Jeremy Snodgrass; Judy Yee; Micky Minhas

(57) ABSTRACT

A data-holding subsystem holding instructions executable by a logic subsystem is provided. The instructions are configured to receive one or more touch-input messages reporting touch contacts recognized by a touch input device, if a touch contact reported by the one or more touch-input messages satisfies a first criterion, initiating a virtual mouse input mode, in the virtual mouse input mode, outputting a cursor position corresponding to a position of the touch contact that satisfies the first criterion, if no touch contacts reported by the one or more touch-input messages satisfy the first criterion, and one or more touch contacts reported by the one or more touch-input messages satisfies a second criterion, initiating a multi-touch input mode, and in the multi-touch input mode, outputting a multi-touch gesture command corresponding to the one or more touch contacts that satisfy the second criterion.

18 Claims, 12 Drawing Sheets

(56) References Cited

OTHER PUBLICATIONS

Hodges, et al., "ThinSight: Versatile Multi-touch Sensing for Thin Form-factor Displays", Retrieved at << http://www.billbuxton.com/UISTthinSight.pdf >>, The 20th Annual ACM Symposium on User Interface Software and Technology, Oct. 7-10, 2007, pp. 10.

"Jazz Mutant Hardware Features", Retrieved at << http://www.jazzmutant.com/lemur_features_hard.php >>, Retrieved Date: Nov. 16, 2010, p. 1.

"DuoSense Technology", Retrieved at << http://www.n-trig.com/Content.aspx?Page=DualModeTechnology >>, Retrieved Date: Nov. 16, 2010, p. 1.

Morris, et al., "Surface-Based Collaborative Search", U.S. Appl. No. 12/367,734, filed Feb. 9, 2009, pp. 33.

Smith, et al., "Touch Input for Hosted Applications", U.S. Appl. No. 12/623,456, filed Nov. 23, 2009, pp. 17.

Hodges et al., "Multi-Touch User Interface Interaction", U.S. Appl. No. 12/725,231, filed Mar. 16, 2010, pp. 32.

\* cited by examiner

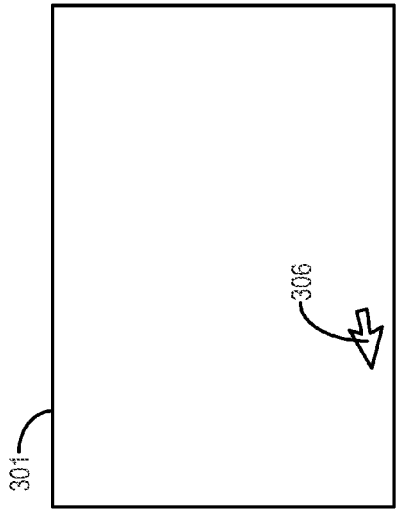
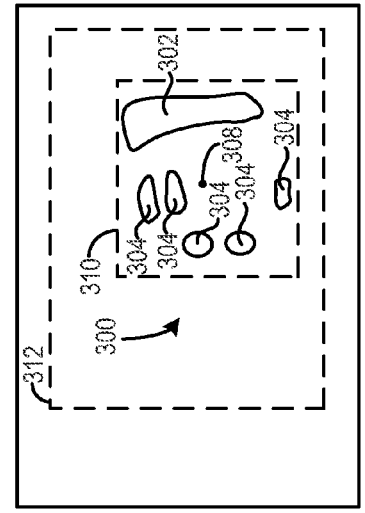
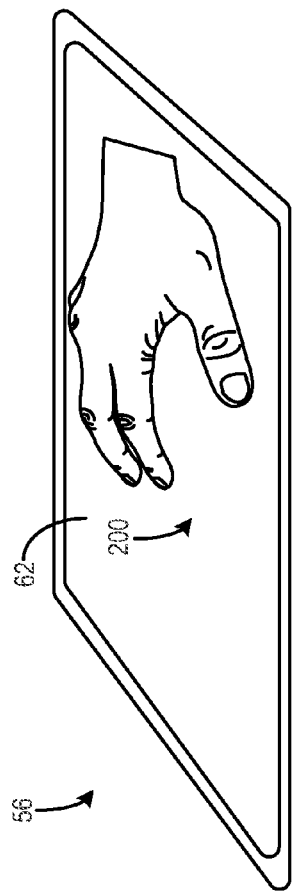

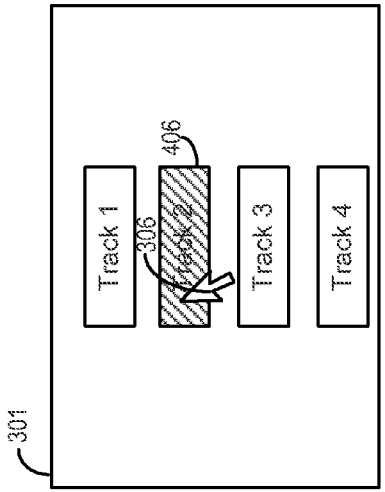
FIG. 4
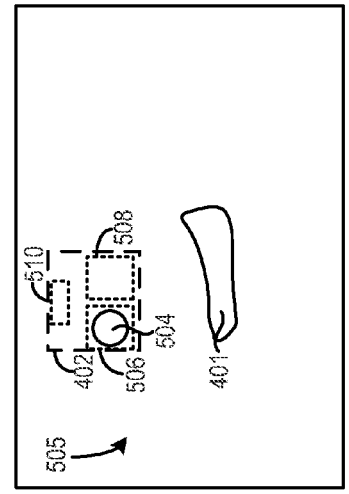
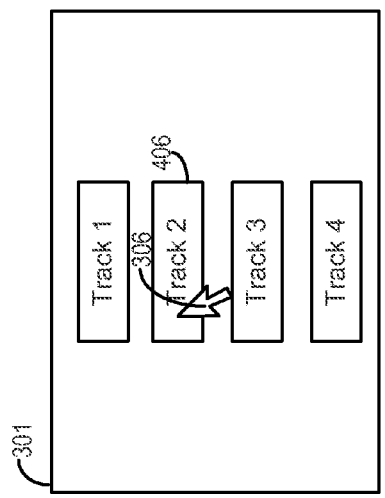
FIG. 5
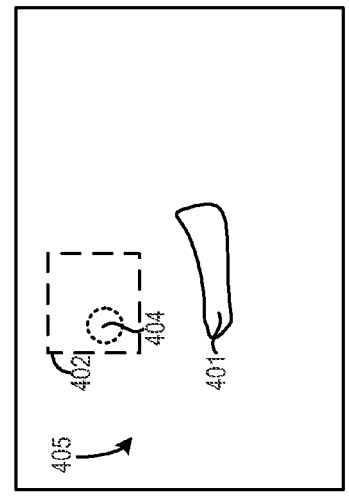

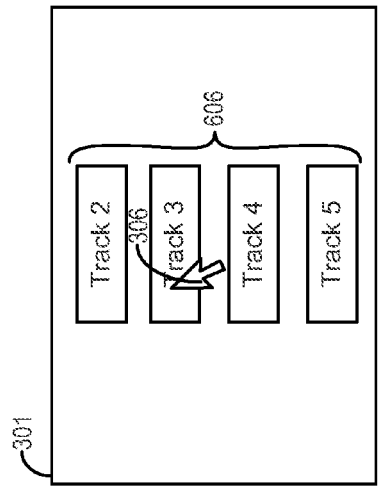
FIG. 6
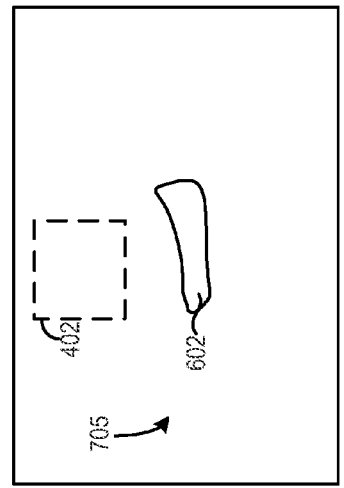
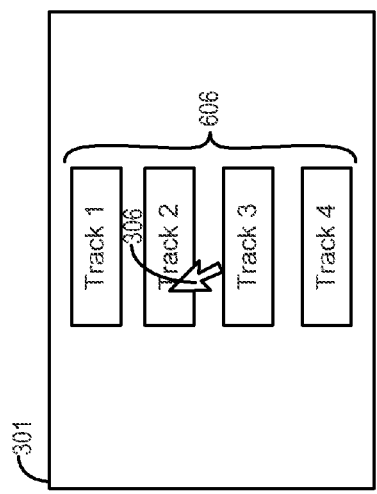
FIG. 7
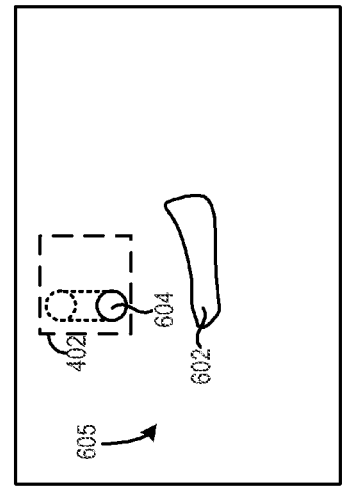

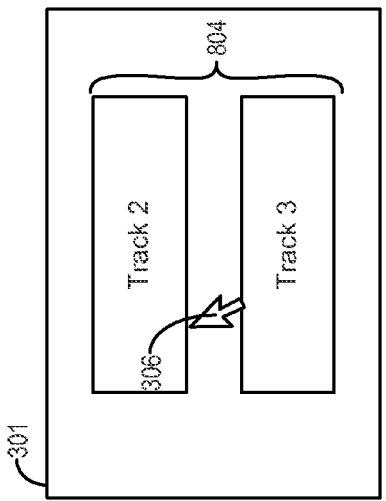
FIG. 9
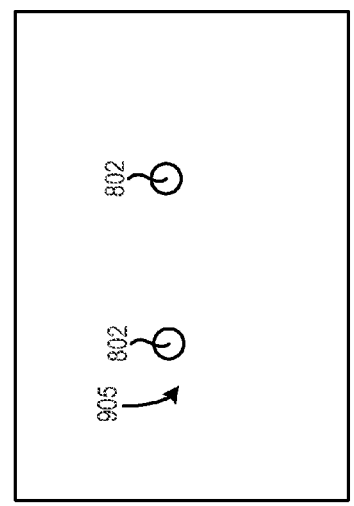
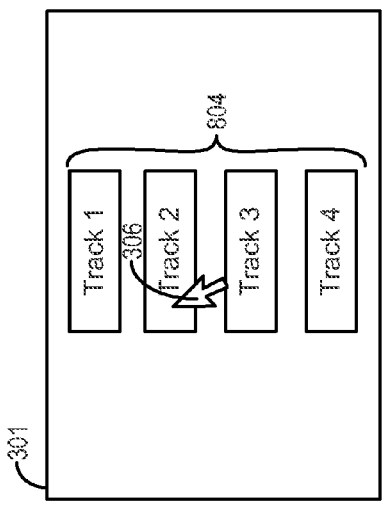
FIG. 8
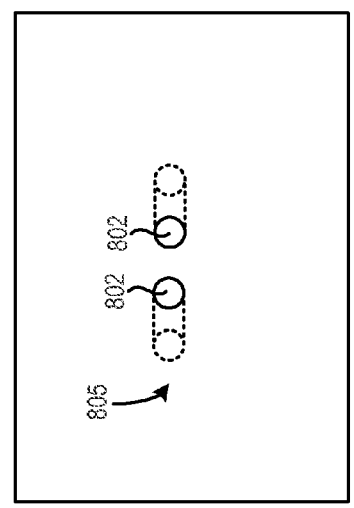

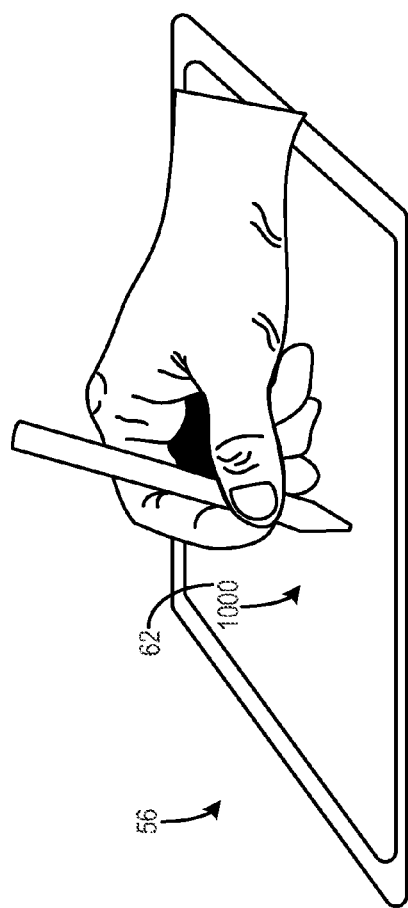
FIG. 10
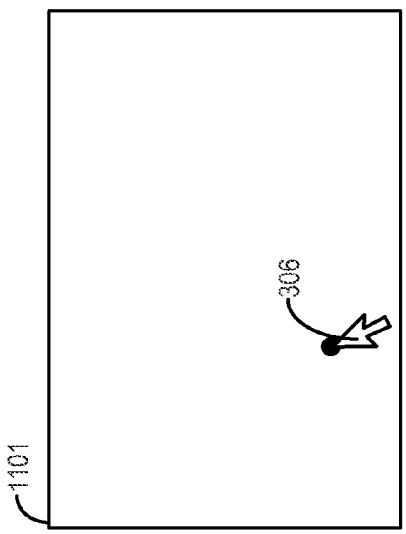
FIG. 11
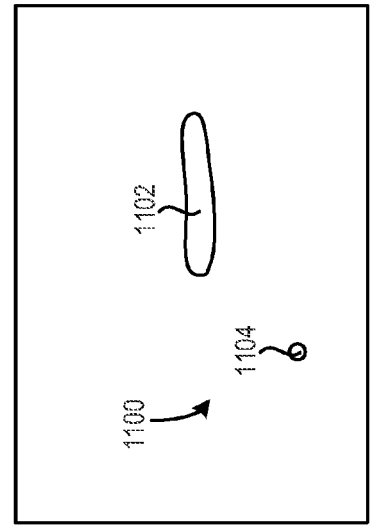

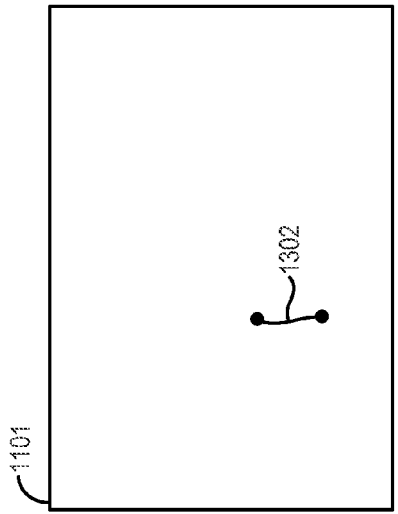
FIG. 12
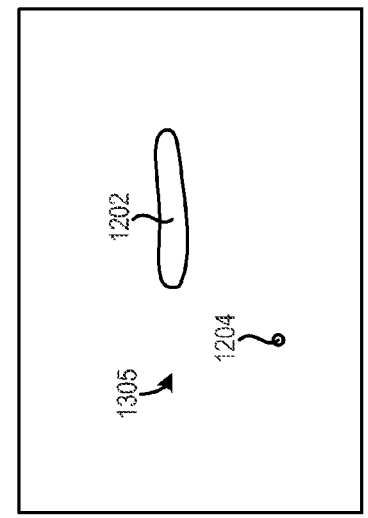
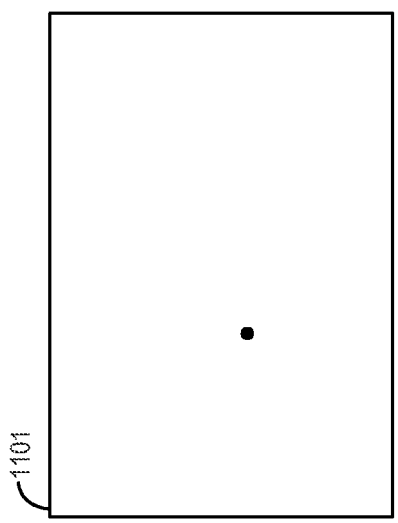
FIG. 13
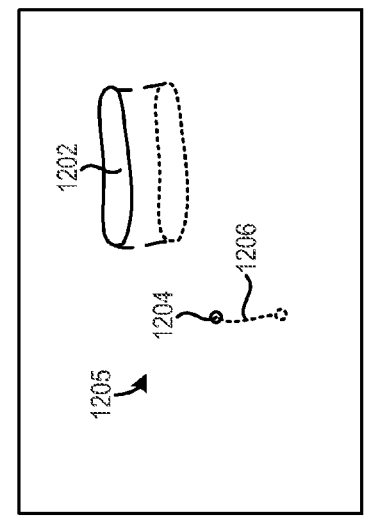

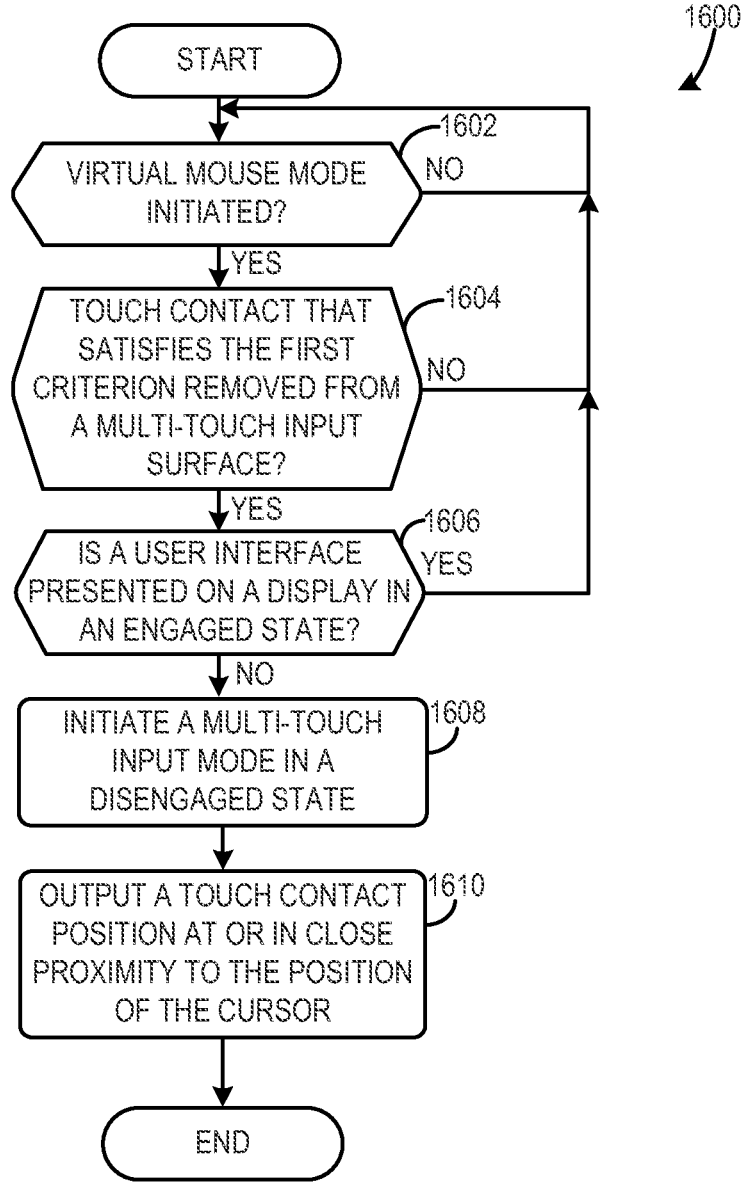

MODAL TOUCH INPUT

BACKGROUND

Computing devices, such as desktops and mobile computing platforms, may be designed to support one or more peripheral devices such as trackpads, thumbpads, trackballs, isometric joysticks, pen tablets, touch pads, touch screens, mouse devices, etc. The aforementioned peripheral devices may be referred to as spatial input and control (SIC) devices. An SIC device allows the user to provide directional input to the system and applications, access arbitrary locations in the user interface, and issue control commands. Each SIC device and host computer combination defines a range of user functions, actions and modalities an interaction model, or method that affords the user spatial input and control over the system. Each SIC method has distinct advantages for specific activities. Many computing devices feature a single dedicated SIC method, and their applications are therefore designed for a limited range of interactions.

Many of the aforementioned SIC devices have various drawbacks. For example, touch screen devices may require a user to interact via a multi-touch surface in an extended, unsupported posture. The user's hand, wrist, arm, and shoulder may become fatigued after interacting with a touch input device for an extended period of time. As a result, a user's interaction with the device may become increasingly uncomfortable and imprecise. Moreover, direct touch interaction may visually occlude a portion of the graphics presented on a touch screen. These problems may be exacerbated when a dense user interface is utilized.

SUMMARY

Accordingly, the description is directed to a data-holding subsystem holding instructions executable by a logic subsystem to receive one or more touch-input messages reporting touch contacts recognized by a touch input device. If a touch contact reported by the one or more touch-input messages satisfies a first criterion, a virtual mouse input mode is initiated. In the virtual mouse input mode, a cursor position corresponding to a position of the touch contact that satisfies the first criterion is output. If no touch contacts reported by the one or more touch-input messages satisfy the first criterion, and one or more touch contacts reported by the one or more touch-input messages satisfies a second criterion, a multi-touch input mode is initiated. In the multi-touch input mode, a multi-touch gesture command corresponding to each of the one or more touch contacts that satisfy the second criterion is output.

In this way, a user may transition quickly and efficiently between virtual mouse input mode and multi-touch input mode using a single touch input device. Thus, the user may employ input modes in a complimentary fashion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows a touch input that triggers initiation of a virtual mouse input mode.

FIG. 3 schematically shows a touch contact image resulting from the touch input shown in FIG. 2.

FIGS. 4 and 5 show touch contact images caused by implementation of a satellite touch input on a multi-touch input surface of a touch input device.

FIGS. 6 and 7 show other touch contact images caused by implementation of another satellite touch input on a multi-touch input surface of a touch input device.

FIGS. 8 and 9 show touch contact images caused by implementation of a multi-touch input gesture or manipulation on a multi-touch input surface of a touch input device.

FIG. 10 show an example touch input that triggers initiation of a stylus input mode.

FIG. 11 schematically shows a touch contact image resulting from the touch input shown in FIG. 10.

FIGS. 12 and 13 show touch contact images caused by implementation of a stylus on a multi-touch input surface of a touch input device.

FIGS. 16-17 show various methods for transitioning between input modes in a computing device.

DETAILED DESCRIPTION

Modal touch input allows a single multi-touch input surface to provide input functionality that has previously necessitated the use of separate input devices. As explained in more detail below, the benefits of mouse, pen, and/or multi-touch input modalities may be achieved via a single interaction model that involves one or both hands interacting directly and in an ergonomically pleasing manner with a multi-touch input surface. In some embodiments, applying the heel of the palm or the edge of the hand to the multi-touch input surface causes the device to act as a mouse, or if a stylus is detected, as a pen. In such embodiments, finger contact in the absence of palm or edge of the hand contact causes the device to act as a multi-touch digitizer. According to the present disclosure, the user may transition between mouse, pen, touch, and/or idle modes by touching the multi-touch input surface with different hand postures (e.g., selective application of the palm or edge of the hand to the multi-touch input surface).

Modal touch input allows a single touch device to provide the most beneficial characteristics of mouse, pen, and multi-touch devices. Further, a user is able to seamlessly transition between different input modes using the touch device.

Figure 1:
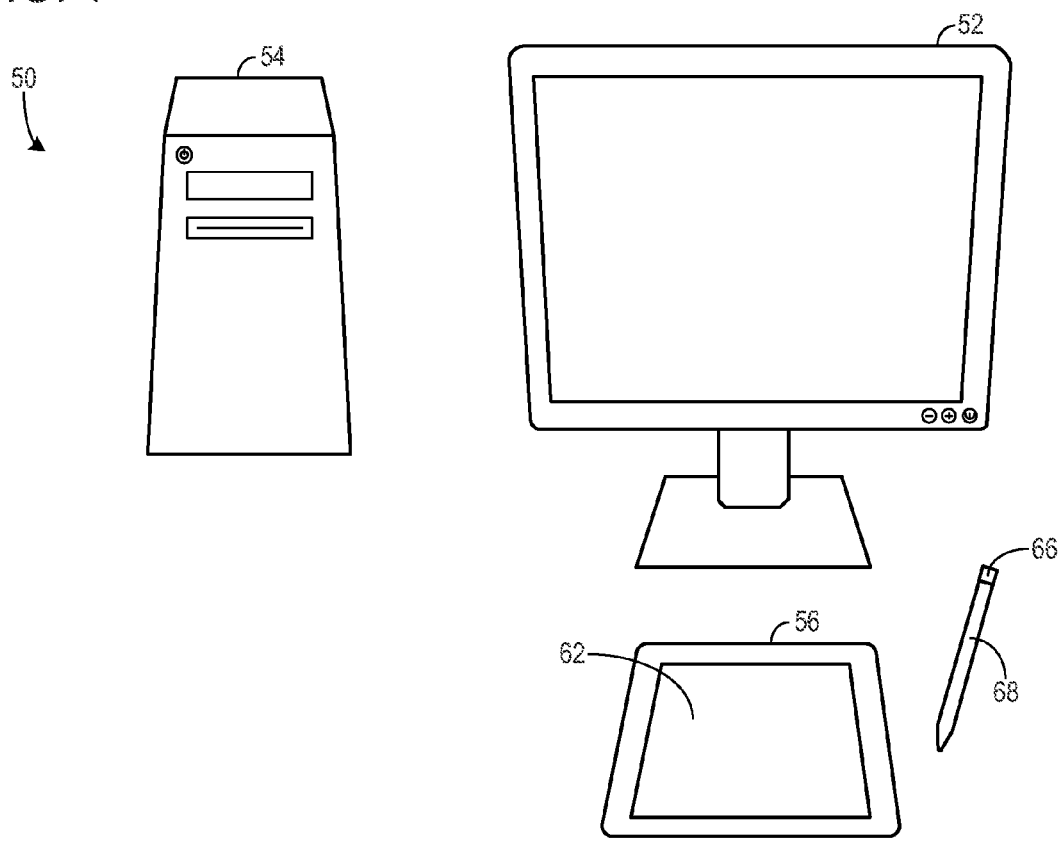
FIG. 1 shows a computing system including a remote touch input device a display, and a computing device.

FIG. 1 shows a computing system 50 that includes a display 52, a computing device 54, and a satellite touch input device 56 that cooperate to provide such modal touch input. The display, computing device, and/or touch input device may be in wired and/or wireless communication with one another. As illustrated, the aforementioned system components each are separately housed and spaced apart. However numerous other suitable system configurations may be utilized. Therefore, in other embodiments one or more of the aforementioned components may be incorporated into a single enclosure. For example, a laptop computing device having the display, computing device, and touch input device integrated into a single housing may be used in some embodiments. Further, in other embodiments, the touch input device may be integrated into the display to form a touch screen device. In such touch screen applications, the display may be configured for horizontal or other non-vertical orientations. In some embodiments, the components may be cooperatively housed in a mobile and/or handheld enclosure.

The touch input device 56 may be configured to recognize touch inputs on a multi-touch input surface 62. The multi-touch input surface may be isometric, in register, and in direct contact with the display 52 or of an arbitrary size, orientation and distance relative to the display 52. Furthermore, contact recognition by the touch input device 56 may be accomplished through any combination of digital and/or analog techniques.

The touch input device 56 may be configured to determine a size, shape, and a location of one or more contacts on the multi-touch input surface 62. The contacts may be touch contacts and/or stylus contacts. Thus the touch input device 56 may be configured to detect and track a plurality of touch contacts and/or stylus contacts. Furthermore, the touch input device 56 may be configured to distinguish between large and small contacts, applied together or in isolation. In some examples, the size threshold between the large and small contacts may be a configurable parameter. Additionally, the touch input device 56 may be configured to distinguish a small focused stylus contact from a touch contact implemented via a finger, palm or edge of the hand of a user. Further, in some examples, the touch sensing subsystem 64 may be configured to determine a 2-dimensional orientation of a touch contact. In this way, the touch sensing subsystem may be able to distinguish a large variety of touch inputs.

A touch input may include the application, removal, and/or movement of one or more touch contacts on the multi-touch input surface 62. Furthermore, the touch input device 56 may be configured to generate touch-input messages reporting touch contacts recognized by the touch input device 56. The touch-input messages may be sent to the onboard or off-board computing device for processing. The touch-input messages may be formatted according to any communication protocol compatible with the touch input device and the computing device. In some embodiments, the touch-input messages may include one or more different data structures indicating which pixels/areas of a multi touch input surface are being touched, the orientation and geometry of the touch contact, the pressure with which such pixels/areas are being touched, and/or other information pertinent to the touch. All pixels/areas may be reported in a single message, or different messages may be used to report different pixels/areas and/or different touches. The touch-input messages may be communicated in real-time, so that changes to the touch status of the multi-touch input surface may be recognized and processed as the changes occur.

In some examples, touch input device 56 may further be configured to receive a stylus input signal and send a message reporting the signal to the onboard or off-board computing device for processing. The stylus input signal may be sent from a communication device 66 included in a stylus 68. Thus, suitable discovery and communication protocols may be used by the computing system 50 to enable the touch input device 56 to recognize the stylus. Nonlimiting examples of such discovery and communication protocols may utilize RFID sensing and/or a wireless communication protocol, such as IEEE 802.15. In some embodiments, stylus recognition may be performed at least in part, if not exclusively, by the size, position relative to other contacts, and/or shape of the touch contact from the stylus on the multi-touch input surface—i.e., small, focused, point contact indicates a stylus touch.

As shown, the multi-touch input surface 62 may be substantially planar. However, in other examples, the multi-touch input surface may have a non-planar contour (e.g., curved).

The touch input device 56 may be configured to operate in a virtual mouse input mode and a multi-touch input mode. Further, in some embodiments, the touch input device may be configured to operate in a stylus input mode. Each of the aforementioned input modes may have a set of corresponding commands that may be initiated in response to different types of inputs performed while the computing system 50 is in the particular input mode of operation.

Each mode may have at least one initiation criterion that determines when that input mode is initiated. For example, if a touch contact reported by one or more touch-input messages fulfills a first criterion, the virtual mouse input mode is initiated. When a user applies a large diffuse contact, such as that of the palm heel or the side of the hand to the multi-touch input surface 62, the first criterion may be fulfilled, and the virtual mouse input mode may be initiated, for example.

FIG. 2 depicts a user 201 performing an example touch input 200 on a multi-touch input surface 62 of touch input device 56. It will be appreciated that the depiction of the touch input device 56 shown in FIG. 2 is exemplary in nature and the touch input device 56 may take a variety of forms in other embodiments as previously discussed. As shown, the user may rest a portion of their hand (e.g., palm, knuckles of ring and pinky fingers, tips of thumb, index, and middle fingers) on the multi-touch input surface 62. Such a hand posture is akin to the hand posture of holding a mouse, and the hand is supported in much the same way as when holding a mouse. Thus, during long periods of input a user may experience a decreased amount of fatigue in their hand, wrist, arm, and shoulder when compared to other types of touch input techniques requiring a user to keep their palm elevated above the multi-touch input surface.

FIG. 3 schematically shows a touch contact image 300 resulting, from touch input 200 of FIG. 2. It is to be understood that the touch contact image 300 is illustrated to visually portray the data structure(s) that may be used to represent the touch contacts in a machine readable form understandable by the computing device. In practice, the data structures) may include a matrix of pixel cells, and each pixel cell in the matrix may hold one or more values indicating the touch state at that pixel (e.g., touch present, touch pressure, etc.). FIG. 3 visually portrays this type of information for clarity of explanation. While a matrix is provided as an example data structure, it is not intended to be limiting. Any suitable data structure(s) may be used.

FIG. 3 also schematically shows a user interface 301, which may be displayed on a display, such as display 52 of FIG. 1. The user interface may belong to an operating system, application, and/or other program of a computing system, such as computing system 50 of FIG. 1.

In FIG. 3, the touch contact image 300 includes a diffuse touch contact image 302 and satellite touch contact images 304. It is to be understood that the diffuse touch contact image 302 represents a diffuse contact applied to a multi-touch input surface and the satellite touch contact images 304 represents satellite touch contacts applied to the multi-touch input surface.

If one of the touch contacts satisfies a first criterion, the virtual mouse input mode may be initiated. Specifically, the first criterion may be satisfied if a size aspect of the diffuse touch contact is greater than a size threshold, if a size aspect is within a range of threshold sizes, and/or a shape aspect of the diffuse touch contact matches a palm profile. Further, each touch contact may be analyzed according to two or more different parameters (e.g., size, shape, position relative to other contacts, etc.) A confidence that a touch contact results from a particular body part may be calculated in accordance with the individual analysis of the different parameters. In such embodiments, the first criterion may be compared against a confidence threshold (i.e., the first criterion is satisfied if the calculated confidence is above a predetermined confidence threshold). In this way a determination of whether a particular touch contact results from a user's palm may be based on the size of the contact, the shape of the contact, the relative position of the contact compared to other contacts, and/or other factors.

In some embodiments, best-fit matching to a single or modular, whole- or partial-hand template may be used to determine what body parts are responsible for different touch contacts. A template is a geometric construct that defines regions used to identify the various contacts of the hand. A template region representing one or multiple contacts may be bounded or unbounded in any particular direction. A template may be size-calibrated to the user's hands, but to accommodate variation in contact placement, the placement of template regions is non-static and relies on the spatial relationships among their associated contacts. More than one template may be used. Each template may represent a distinct hand posture anticipated from the device form factor and the use context of the device. The system may use geometric fit heuristics to match contacts to template regions for the purpose of interpreting touch input events.

In the illustrated example, the diffuse touch contact represented by diffuse contact image 302 may satisfy the first criterion and therefore the virtual mouse mode may be initiated.

In the virtual mouse input mode, a cursor position corresponding to a position of the touch contact that satisfies the first criterion may be may be determined and used to position a cursor on the user interface. Accordingly, in the virtual mouse input mode, a cursor 306 may be presented on the user interface 301 in response to initiation of the virtual mouse input mode, and the position of the cursor within the user interface can move responsive to movement of the touch input on the multi-touch input surface. In FIG. 3, the cursor is depicted as an arrow. However, in other embodiments the cursor may have another suitable shape.

The position of the cursor may track a position of the diffuse touch contact image 302 and/or satellite touch contact images 304. In some embodiments, the cursor position may track the geometric center 308 or boundary box 310 of the touch contact image 300. The boundary box 310 may be a quadrilateral or other suitable shape that may enclose the touch contacts included in the touch contact image 300. The geometric center 308 of the bounding box is provided as a nonlimiting example. In other embodiments, cursor position can be determined by the geometric center of the largest touch contact or another suitable criteria.

When the virtual mouse input mode is initiated and the cursor 306 is presented on the display, subsequent changes in the position of the touch contacts may cause the position of the cursor 306 to be correspondingly changed in the user interface 301. Therefore, if a diffuse touch contact is moved across a multi-touch input surface, the cursor may be correspondingly moved across the user interface 301.

In some embodiments, a touch contact may be lifted and reapplied to a different location on the multi-touch input surface without changing the position of the cursor on the user interface. Repeating this interaction allows a cursor to be moved across a long path of the user interface on a relatively small multi-touch input surface. In some embodiments, the position of the cursor on the user interface may be scaled to move relatively farther as the velocity of the touch contact across the multi-touch input surface increases.

In sonic embodiments, the cursor position may be offset from the geometric center 308 or boundary box 310 (or another determined point) of the touch contact image 300. Offsetting the cursor may be particularly beneficial when the user interface 301 is integrated into a touch screen device, where offsetting the cursor may prevent a user's hand from blocking their view of the cursor 306.

In some embodiments, contact of the palm or edge of the hand may initiate the virtual mouse mode, but cursor tracking may take place under the index or other finger rather than the palm or edge of the hand.

In some embodiments, real-time transfer of cursor tracking between the palm or hand edge and one or more fingers may be afforded. For example, using an peripheral touch device, raising and reapplying the index and middle fingers to the same location on the multi-touch input surface within a configurable time interval (two-finger tap), cursor tracking may be transferred to those fingers. Following this sequence, the palm may remain resting or be raised. If one of the fingers is lifted, tracking cursor may continue under the residual finger contact. If both fingers are lifted or the palm is raised and then reapplied after a configurable time interval, the cursor tracking may be restored to the palm or hand edge. In another example, lifting all resting fingers except the index finger and/or the thumb with the diffuse contact of the palm or edge of hand sustained can cause the mouse tracking point to transfer to the index finger. In this embodiment, restoring satellite contacts restores the cursor tracking to the geometric center of the palm or hand edge.

Engaging an object or view in the user interface in virtual mouse mode using finger contact may also transfer mouse cursor tracking to that finger. Disengaging the object or view by removing the finger can restore tracking to the palm or hand edge provided the palm or hand edge is in contact with the multitouch input surface when disengagement takes place.

In transfers of mouse cursor tracking among touch contacts using a peripheral touch device, the position of the cursor may not change. Displacement of the position of the cursor may require movement of the cursor tracking contact on the multi-touch input surface. Further, in some embodiments, a mouse control region 312 may be provided to track mouse command events, such as button clicks and scroll and scaling manipulations. Within the mouse control region, touch inputs may be interpreted as virtual mouse contacts, and outside the mouse tracking region touch inputs may be interpreted as a multi-touch gesture or manipulation. The mouse control region may be sized and positioned so that all same-hand contacts can be considered mouse events from the mousing hand, while off-hand contacts from the other hand can be analyzed as separate multi-touch events.

Various satellite touch inputs may be implemented in the virtual mouse input mode. FIGS. 4-5 schematically show touch contact images 405 and 505 resulting from a satellite touch input executed on a multi-touch input surface, such as multi-touch input surface 62 shown in FIGS. 1 and 2. Touch contact image 405 includes the diffuse touch contact image 401 representing a diffuse touch contact applied to a multi-touch input surface. Additionally, touch contact image 505 includes the diffuse contact image 401 representing the diffuse touch contact and a satellite touch contact image 504 representing a satellite touch contact applied to the multi-touch input surface. The diffuse touch contact represented via the diffuse touch contact image 401 may fulfill the first criterion and therefore the virtual mouse mode may be initiated in FIGS. 4 and 5.

As shown in FIGS. 4 and 5, a control region 402 may be defined in the virtual mouse input mode. The location of the control region 402 may be based on the position and/or shape of the diffuse touch contact. Likewise the size of the control region 402 may be based on the size of the diffuse touch contact, in other words, the general position with which a user's index and/or middle fingers would likely touch the multi-touch input surface may be inferred from the size and shape of the touch contact from that user's palm.

Touch inputs executed within the control region 402 and matching certain additional criteria may trigger execution of corresponding commands. On the other hand, touch inputs executed outside the control region may be ignored. In this way, a user may rest their thumb, little finger, knuckles, etc., on the multi-touch input surface 62 without triggering input commands. In some examples, a configurable time interval may be established in which to execute the satellite touch input to reduce the likelihood of inadvertent activation of a satellite mouse command.

An exemplary satellite touch input is a mouse click touch input. For example, a mouse click touch input may include removing a satellite touch contact from a multi-touch input surface, represented by satellite contact image 404 in FIG. 4, and re-applying the satellite touch contact to the multi-touch input surface, represented by satellite touch contact image 504 in FIG. 5. It will be appreciated that the satellite touch contact is executed within the control region 402. Alternatively, a mouse click touch input may include an application and subsequent removal of a satellite touch contact on a multi-touch input surface within the control region.

Another exemplary satellite touch input is a mouse drag touch input. A mouse drag touch input may consist of (1) a tap or increased pressure under the finger to send a click message to the system and engage an element of the user interface, (2) transfer of cursor tracking to the finger, (3) movement of the finger to displace the element, and (4) lifting of the finger to disengage the element and terminate dragging.

In response to the implementation of the satellite touch input on the multi-touch input surface within the control region 402, a satellite mouse command may be output. The satellite mouse command may be a right click command, a left click command, or an auxiliary button command, for example. Click commands may include multi-click commands (e.g., double click commands). The satellite mouse commands and corresponding satellite touch inputs may be similar to the types of inputs that may be provided by a peripheral mouse. As a result, the user may quickly learn how to implement mouse commands in the virtual mouse input mode.

As shown in FIG. 5, the satellite mouse command may trigger engagement of an object 406 presented on the user interface 301. Therefore, the user interface may be in an engaged state when an object is engaged. In some embodiments, movement of the diffuse touch contact and/or satellite touch contact may trigger movement of the engaged object 406 presented on the user interface 301. On the other hand the user interface is in a disengaged state when the cursor 306 may be freely moved around the display without causing actuation or persistent changes to the view or an object in the user interface. Other input modes may also be in engaged and disengaged states, discussed in greater detail herein.

The aforementioned satellite mouse commands (i.e., right click command, left click command, and/or auxiliary button command) may be distinguished by the location of the satellite touch input. As shown in FIG. 5, a left click region 506, a right click region 508, and an auxiliary button region 510 may be designated in the virtual mouse input mode. As shown in FIG. 5, the right click region, left click region, and auxiliary input region are included in the control region 402. In some examples, the location of the regions may be selected based on the position and/or shape of the diffuse touch contact. In additional examples, the auxiliary input command may be assignable via the user. Moreover, a user may calibrate the right click, left click, and auxiliary button regions. In this way, the virtual mouse input mode may be customized according to a user's predilection and/or anatomy.

In some examples, removal of the diffuse touch contact may trigger cessation of the mouse input mode and therefore the interpretation and/or transmission mouse commands (e.g., cursor commands, click commands, etc.) may be stopped. However in sonic examples, a cursor position may be output after cessation of the virtual mouse input mode—i.e., to allow a user to lift a hand to resume tracking from another portion of the multi-touch input surface.

FIGS. 6-7 schematically show touch contact images 605 and 705 resulting from another satellite touch input that may be executed on a multi-touch input surface, such as multi-touch input surface 62 shown in FIGS. 1 and 2. Touch contact image 605 includes the diffuse touch contact image 602 representing a diffuse touch contact applied to a multi-touch input surface and a satellite touch contact image 604 representing a satellite touch contact applied to the multi-touch input surface. As previously discussed, the diffuse touch contact may fulfill the first criterion and therefore the virtual mouse mode may be initiated in FIGS. 6 and 7.

The satellite touch input of FIGS. 6 and 7 is a mouse scroll touch input. The mouse scroll touch input includes applying a satellite touch contact to a multi-touch input surface represented by satellite touch contact image 604 of FIG. 6, dragging the satellite touch contact within the control region, and subsequently removing the satellite touch contact from the multi-touch input surface, as shown in FIG. 7. In response to execution of mouse scroll touch input, a scrolling command may be output. The scrolling command may trigger scrolling through a list of objects 606 presented on the user interface 301. Vertical scrolling is depicted, however horizontal and/or off-axis scrolling may be implemented in other embodiments. The direction of scrolling may correspond to the direction of the satellite touch input in relation to the diffuse touch contact. For example, if the satellite touch input moves in a direction generally towards or away from the diffuse touch contact, vertical scrolling may implemented.

In the virtual mouse mode, certain manipulations characteristic of multi-touch spatial input control (SIC) such as zoom, pan, and rotate, can be afforded. With the virtual mouse modality is activated by virtue of the palm or hand edge in contact with the multi-touch input surface, the user may raise and reapply the thumb and one or more fingers to their starting locations on the multi-touch input surface simultaneously and within a configurable time interval (tap), or increase pressure of the thumb and fingers simultaneously beyond a configurable threshold on a pressure sensitive multi-touch input surface, to signal the start of the multi-touch input manipulation. This interaction causes the computing system to leave virtual mouse mode and enter multi-touch input mode. In multi touch input mode, mouse navigation events may be suppressed. The user may leave multi-touch input mode and return to virtual mouse mode by lifting or releasing pressure of the thumb and fingers from the multi-touch input surface while keeping the diffuse contact of the palm or side of the hand applied.

If no touch contacts satisfy the first criterion (i.e., not contacts are sized or shaped like palm contacts), and one or more touch contacts satisfies a second criterion, a multi-touch input mode may be initiated. As a nonlimiting example, the second criterion may be one or more fingertip sized and shaped contacts being recognized. As such, the second criterion may be satisfied if a size aspect of one or more touch contacts is less than a threshold size and/or one or more touch contacts are in a predefined multi-touch region. Further, in some embodiments, application of a large diffuse contact to the multi-touch input surface that fulfills the first criterion may cause discontinuation of the multi-touch input mode and initiation of the virtual mouse input mode. In other embodiments, mouse mode may be initiated for some touch contacts (e.g., right hand contacts), while multi-touch input mode is initiated for other touch contacts (e.g., left hand touch contacts).

In the multi-touch input mode, multi-touch gesture commands may be output in response to implementation of multi-touch input on a multi-touch sensing surface, such as the multi-touch sensing surface 62 shown in FIG. 1. The multi-touch gesture commands may correspond to the one or more touch contacts that satisfy the second criterion, in particular, the multi-touch gesture commands may correspond to one or both of input gestures and manipulation events. An example of an input gesture is a user tracing the shape of the letter "S" to save a document. In such a case, the multi-touch gesture command may correspond to the completed gesture. An example of a manipulation event is a pinching movement of a user's finger and thumb, which may be performed to scale a photograph. In such a case, the multi-touch gesture command(s) may be continually updated so as to track the scaling in real-time.

FIGS. 8-9 schematically show touch contact images 805 and 905 resulting from an example multi-touch input gesture implemented in a multi-touch input mode. The multi-touch input gesture may be executed on a multi-touch input surface, such as multi-touch input surface 62 shown in FIGS. 1 and 2. Touch contact image 805 includes touch contact representations 802 depicting satellite touch contacts applied to a multi-touch input surface. One or both of the touch contacts depicted via touch contact representations 802 may fulfill the second criterion while no touch contacts satisfy the first criterion i.e., no large diffuse contact resulting from palm touch contact). When the user applies fingertip contacts to the multi-touch input surface in the absence of a diffuse touch contact, the computing system may enter the multi-touch input mode. It will be appreciated that when the multi-touch input mode transitions from the virtual mouse input mode, the focus of the multi-touch input mode initially may be located at the position of the cursor. In some embodiments when two separate hands are tracked on the multi-touch input surface only one of the hands may trigger a transition from the multi-touch input mode into the virtual mouse input mode. However, in other embodiments both of the hands may trigger a transition from the multi-touch input mode into the virtual mouse input mode.

As one nonlimiting example, the multi-touch input gesture or manipulation may include applying two touch contacts, depicted by the touch contact representations 802 of FIG. 8, to a multi-touch input surface and subsequently spreading the touch contacts apart, as shown in FIG. 9. Such an interaction may be a zoom manipulation, for example.

In response to the execution of the multi-touch gesture or manipulation, a specific command or multi-touch events are output and executed in the user interface, respectively 301. In this particular example, the multi-touch interaction is a zoom manipulation. Therefore, objects 804 presented on the user interface 301 are enlarged as the contacts diverge, and grow smaller as the contacts converge.

It will be appreciated that a multitude of different multi-touch gesture commands and/or manipulation events may be output in response to multi-touch input. The multi-touch gesture commands may include an activate or launch command, engage/disengage command, pan events, drag events, resize events, viewport scaling events, rotate events, and/or skew events, among others.

For example, to implement an engage command in the multi-touch input mode, a touch contact may be applied to a multi-touch input surface, and a second criterion, such as the pressure of the contact on the multi-touch input surface surpassing a mechanical or electronic threshold, is fulfilled. These conditions may cause an object presented on user interface to become engaged 301. Engagement enables additional operations on the object, which include but are not limited to affine transformation (e.g., displacement, rotation, scaling and/or skew).

As shown in FIGS. 8 and 9, in the multi-touch input mode the position of the cursor 306 output in previously initiated operating modes (e.g., the virtual mouse input mode) may be sustained. Therefore the cursor position in the virtual mouse input mode may be sustained in the multi-touch input mode. The cursor position may provide an origin of affine transforms such as displacement, pan, scaling, rotate, skew, etc.

If a touch contact reported by the one or more touch-input messages generated by the touch input device 56 satisfies a third criterion, a stylus input mode may be initiated. FIG. 10 depicts a user performing a stylus input 1000 on the multi-touch input surface 62 of touch input device 56. As shown, the user may rest a portion of their hand on the multi-touch input surface 62. Thus, during long periods of input a user may experience a decreased amount of fatigue in their hand, wrist, arm, and shoulder when compared to other types of touch input techniques requiring a user to hold their hand in an unsupported position while performing inputs.

FIG. 11 schematically shows a touch contact image 1100 resulting from stylus input 1000, shown in FIG. 10. It is to be understood that the touch contact image 1100 is illustrated to visually portray the data structure(s) that may be used to represent the touch contacts in a machine readable form understandable by the computing device. In practice, the data structure(s) may include a matrix of pixel cells, and each pixel cell in the matrix may hold one or more values indicating the touch state at that pixel (e.g., touch present, touch pressure, etc.). FIG. 11 visually portrays this type of information for clarity of explanation.

FIG. 11 also schematically shows a user interface 1101, which may be displayed on a display, such as display 52 of FIG. 1. The user interface may belong to an operating system, application, and/or other program of the computing system, such as computing system 50 shown in FIG. 1.

As shown in FIG. 11, touch contact image 1100 includes a diffuse touch contact image 1102 and a focused stylus contact image 1104. It is to be understood that the focused stylus contact image 1104 represents a focused stylus contact applied to a multi-touch input surface and the diffuse touch contact image 1102 represents a diffuse touch contact applied to the multi-touch input surface. The focused stylus contact and/or the diffuse touch contact may satisfy the third criterion. In some examples, the third criterion is satisfied if the touch contact conforms to a particular size, shape, position and/or pressure profile of a focused point contact, and/or a shape aspect of the touch contact matches an ulnar profile. It will be appreciated that the ulnar profile may be a predetermined shape range corresponding to a profile of an ulnar side of a user's hand. Further, in some examples, the stylus input mode may be initiated when an electronic stylus in-contact signal is received by the touch input device. Such a signal may originate from a radio, resistive, capacitive, optical or other sensor technology.

The above criteria are nonlimiting; examples. Any suitable criteria may be utilized for determining when a user is using a stylus to touch a multi-touch input surface. When such a determination is made, the stylus input mode may be initiated.

In FIG. 11 the position of cursor 306 presented on the user interface 1101 may be sustained from a previous mode of operation, such as a mouse input mode of operation, or the cursor position can jump to a new position. As nonlimiting examples, when the touch input device is a touch screen device the position of the cursor may jump to a location under the tip of the stylus. However, when the touch input device is a peripheral input device, the position of the cursor may be sustained when switching into the stylus input mode from the virtual mouse input mode.

Various inputs may be implemented in the stylus input mode. FIGS. 12 and 13 schematically show touch contact images 1205 and 1305 resulting from a stylus input executed on a multi-touch input surface, such as multi-touch input surface 62 shown in FIGS. 1 and 2. The touch contact image 1205 includes a diffuse touch contact image 1202 representing a diffuse touch contact applied to a multi-touch input surface and a focused stylus contact image 1204 representing a focused stylus contact applied to the multi-touch input surface. The focused stylus contact and/or the diffuse touch contact may satisfy the third criterion. Therefore, the stylus input mode may be initiated in the user interface 1101.

The stylus input includes applying the focused stylus contact represented via the focused stylus contact image 1204 of FIG. 12, sliding the focused stylus contact along a path 1206, and removing the focused stylus contact, as shown in FIG. 13.

In response to implementation of the stylus input, a stylus command may be output. The stylus commands may include a drawing, command configured to present a line 1302 on the user interface 1101 corresponding to path 1206. However, other stylus commands may be implemented in other examples.

In some embodiments, removal of the diffuse touch contact from the multi-touch input surface may trigger termination of the stylus input mode. Further, in some embodiments, removal of the focused stylus contact may trigger termination the stylus input mode regardless of the diffuse touch contact. Loss of the stylus signal may also trigger termination of the stylus input mode. Further, in some embodiments, removal of the focused stylus contact when the diffuse touch contact is applied to the multi-touch input surface may cause the stylus input mode to be terminated and the virtual mouse input mode to be initiated.

Furthermore, touch inputs applied to the multi-touch input surface may be disregarded in the stylus input mode. Therefore, in some embodiments finger taps (i.e., the application and subsequent removal of a touch contact on the multi-touch input surface) and other finger movements in the stylus input mode are disregarded.

In other embodiments, the stylus input mode and the multi-touch input mode may be simultaneously enabled. For example, a user my use one hand to implement stylus inputs and use the other hand to implement multi-touch gestures. Therefore in some embodiments, touch contacts that are smaller than a threshold value corresponding to a minimum size of a diffuse touch contact and have a discrete geometry may be regarded as touch contacts and tip contacts that are sharp and focused (e.g., having a size aspect less than a threshold value) may be regarded as stylus contacts. Further in some embodiments an idle mode may be initiated when no contacts have been applied to the multi-touch input surface. Likewise the idle mode may be discontinued when one or more contacts are applied to the multi-touch input surface.

Figure 14:
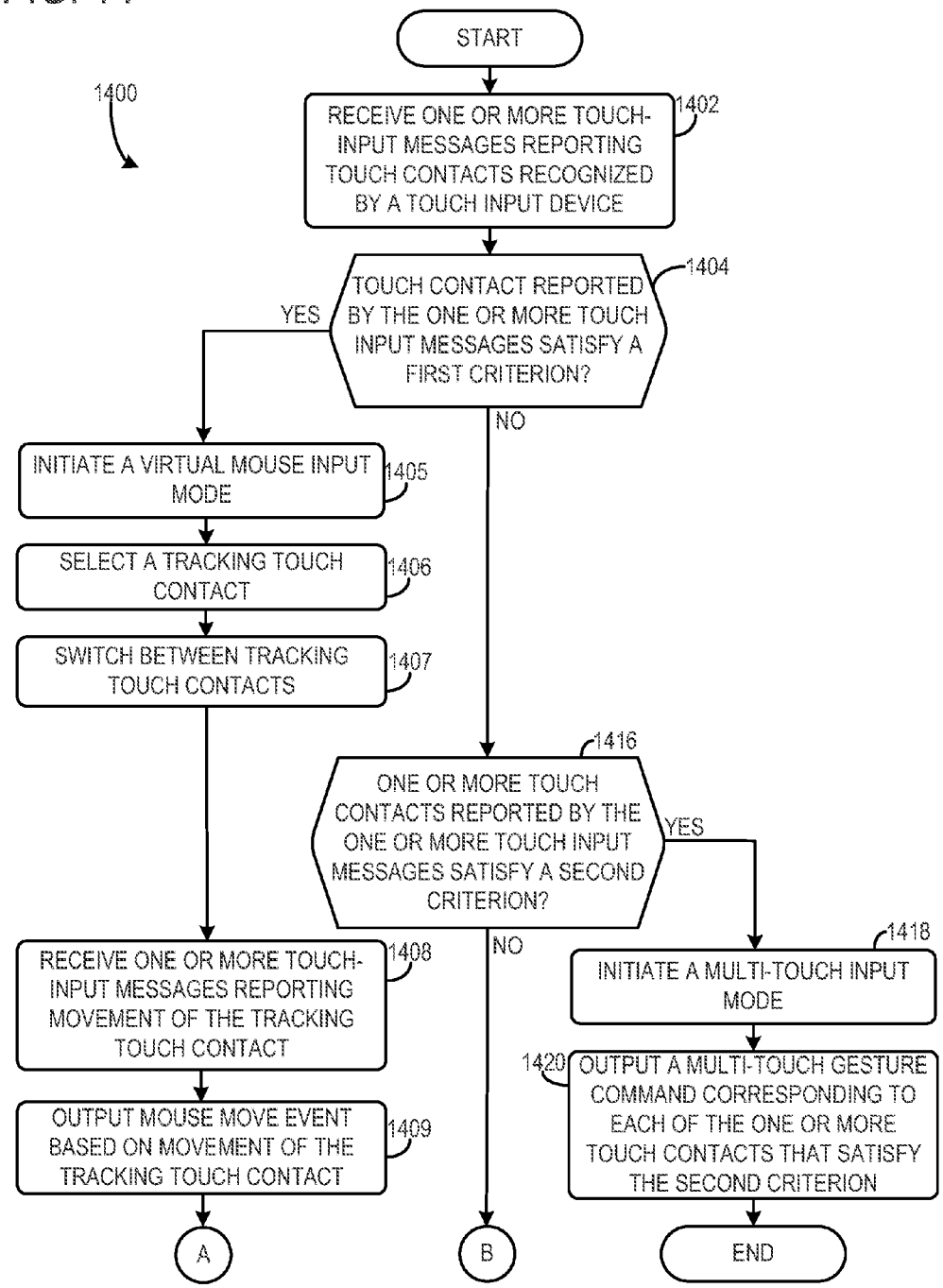
FIGS. 14, 15A, and 15B show an exemplary method for initiating input modes in a computing device.
Figure 15A:
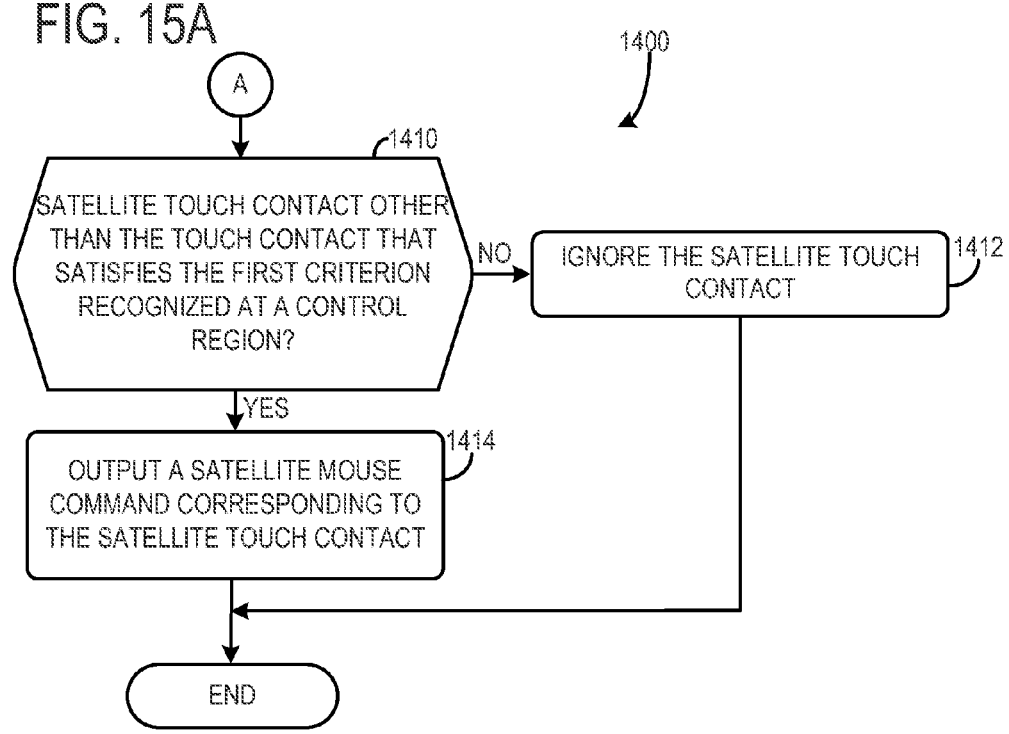
Figure 15B:
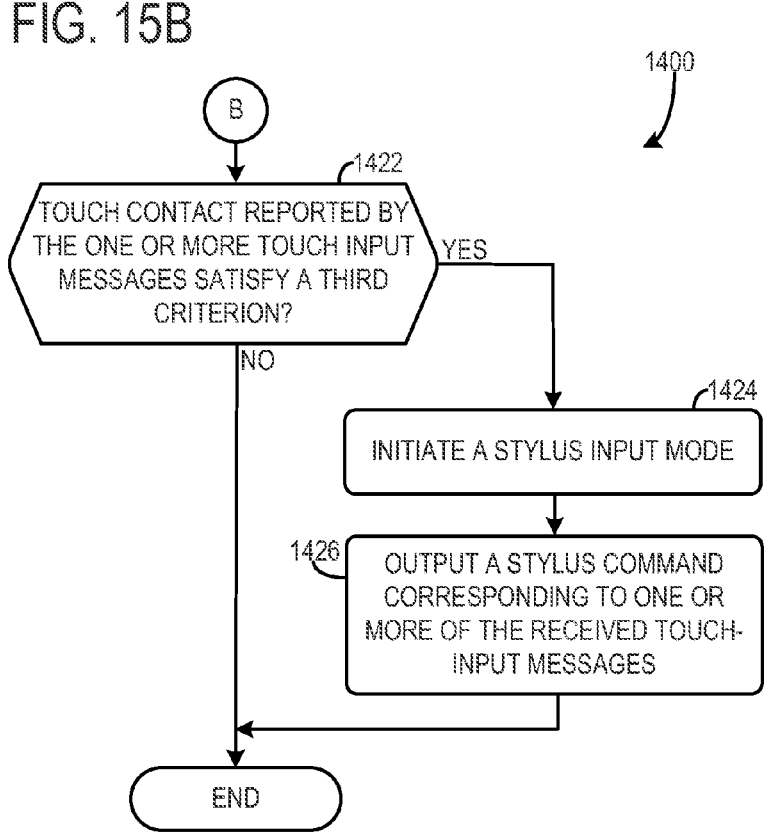

FIGS. 14, 15A, and 15B illustrate an example method 1400 for initiating input modes in a computing system. The method 1400 may be implemented using the hardware and software components of the systems and devices described herein, and/or via any other suitable hardware and software components.

At 1402, the method includes receiving one or more touch-input messages reporting touch contacts recognized by a touch input device. At 1404, it is determined if a touch contact reported by the one or more touch input messages satisfies a first criterion. As previously discussed, the first criterion may be satisfied if one or more aspects of the touch contact conform to a particular size range, shape aspect, or relative position of the touch contact of one or more unique contacts, the palm for example.

If the first criterion is satisfied (YES at 1404), the method proceeds to 1405, where the method includes initiating; a virtual mouse input mode. At 1406 the method includes selecting a tracking touch contact included in the reported touch contacts. At 1407 the method includes switching between the tracking touch contacts. The method includes at 1408 receiving one or more touch-input messages reporting movement of the tracking touch contact. At 1409 the method includes outputting mouse move event based on movement of the tracking touch contact.

Moving to 1410 of FIG. 15A, the method includes determining if a satellite touch contact other than the touch contact that satisfies the first criterion is recognized at a control region. It will be appreciated that the satellite touch contact may be included in the one or more touch contacts reported by the one or more touch input messages received at 1402.

If it is determined that the satellite touch contact is not recognized at a control region (NO at 1410), at 1412 the method includes ignoring the satellite touch contact.

However if it is determined that the satellite touch contact is recognized at a control region (YES at 1410), at 1414 the method includes outputting; a satellite mouse command corresponding to the satellite touch contact.

Turning back to FIG. 14, if it is determined that the touch contact reported by the one or more touch input messages does not satisfy the first criterion (NO at 1404), at 1416 the method includes determining if one or more touch contacts reported by the one or more touch-input messages satisfies a second criterion. As previously discussed, the second criterion may be satisfied if one or more touch contacts are less than a threshold size and/or in a predefined multi-touch region, for example.

If one or more touch contacts reported by the one or more touch-input messages satisfy the second criterion (YES at 1416), at 1418 the method includes initiating a multi-touch input mode. At 1420, the method includes outputting a multi-touch gesture command corresponding to each of the one or more touch contacts that satisfy the second criterion.

Moving to 1422 of FIG. 15B, if it is determined that one or more touch contacts do not satisfy a second criterion (NO at 1416 of FIG. 14), the method includes determining if a touch contact reported by the one or more touch input messages satisfies a third criterion. The third criterion may be satisfied if a size and shape aspect of the touch input is within a predetermined range and/or a shape aspect of the touch contact matches an ulnar profile, for example.

If the touch contact reported by the one or more touch input messages satisfies the third criterion (YES at 1422), at 1424 the method includes initiating stylus input mode. Additionally, the stylus input mode may be initiated in response to reception of an electronic (e.g., radio, optical, etc.) in-range stylus signal, unrelated to tip contact. At 1426, the method includes outputting a stylus command corresponding to one or more of the received touch-input messages.

Within each of the aforementioned modes (i.e., the virtual mouse input mode, the multi-touch input mode, and the stylus input mode) an element of the user interface presented on a display may be in a disengaged state in which target acquisition is being implemented. Target acquisition may include seeking or aiming at one or more user interface objects with which to interact. On the other hand, the user interface may be in an engaged state in which the user is directly interacting with user interface objects. For example, in a disengaged state, a cursor may be moved around the user interface in the virtual mouse input mode. Subsequently, a user may implement a satellite touch input that triggers actuation of a click command. The click command may engage an object over which the cursor is placed, thereby placing; the user interface in an engaged state.

Additionally in some examples, in the virtual mouse input mode button down commands (e.g., left or right button down commands), scroll commands, and/or a zoom commands may trigger engagement of the user interface. In the multi-touch input mode engagement may be triggered while gestures or manipulations are being performed (e.g., satellite contacts are being applied and/or are in motion) on the multi-touch input surface. Further in some examples, the criteria for being in an engaged state may vary based on the type of input gesture or manipulation. In the stylus input mode engagement may be triggered when a pen command, barrel down button, and/or pen tip is in contact with the multi-touch input surface. Disengagement in the virtual mouse input mode, the multi-touch input mode, and/or the stylus input mode may be triggered when the satellite contacts, pen contacts, gestures, manipulations etc., that sustain user interface engagement are removed or released from the multi-touch input surface. The state in which a user interface presented on the display is in (i.e., engaged or disengaged) may affect the transition between the input modes of operation (i.e., the virtual mouse input mode, the multi-touch input mode, and the stylus input mode). For example, when the user interface is in the disengaged state the input mode may directly transition into another input mode in response to a touch contact prompting initiation of another input mode. For example, if a diffuse contact satisfying the first criterion is removed from the multi-touch input surface, the multi-touch input mode may be initiated. As a corollary, in transition from the disengaged state in a first input mode to a second input mode, the disengaged state may be sustained if the input mode supports a disengaged state. However, if a disengaged state is not supported, any residual contacts may be ignored until the user removes and replaces them on the multi-touch input surface. Furthermore, if a touch contact satisfying the first criterion is applied to or removed from the multi-touch input surface in an engaged state, the mode in which the computing system is operating may be sustained.

Figure 17:
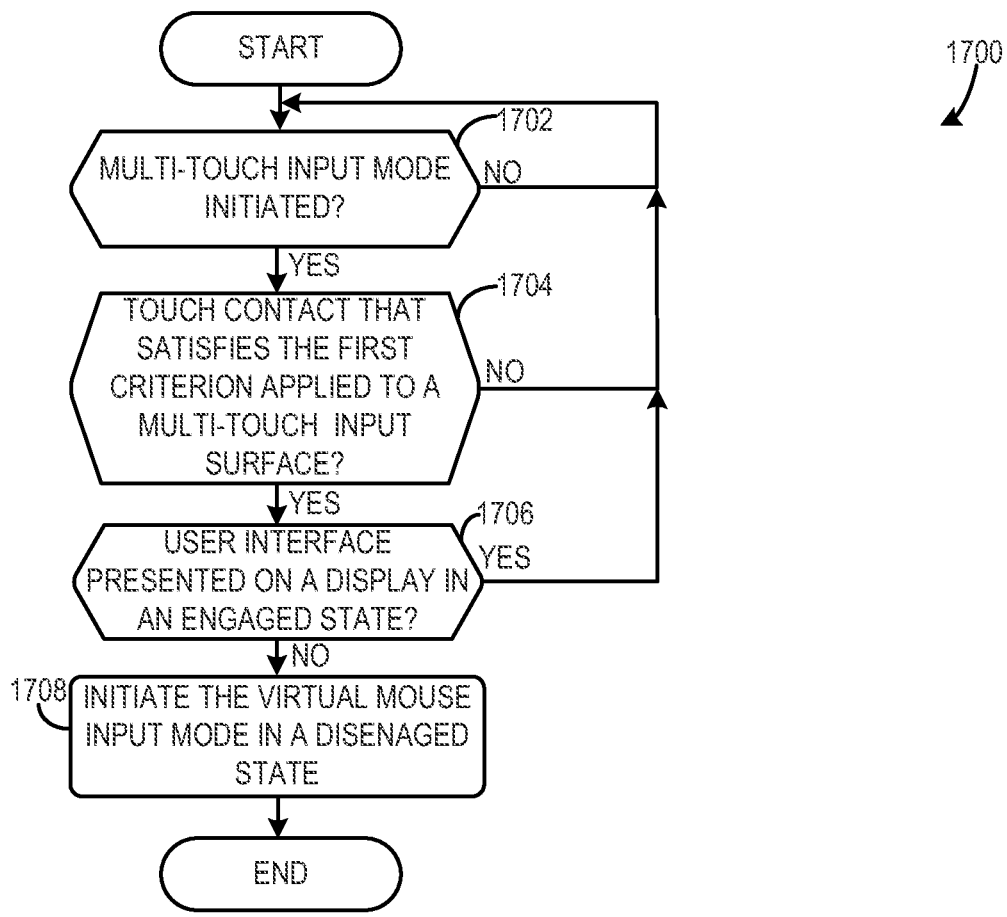

FIGS. 16-17 illustrate various methods for transitioning between input modes. Specifically, FIG. 16 shows a method 1600 for transitioning, between the virtual mouse input mode and the multi-touch input mode. Method 1600 may be implemented using the hardware and software components of the systems and devices described herein, and/or via any other suitable hardware and software components. Specifically, method 1600 may be implemented via a computing system as described above in which the touch input device is a peripheral touch device.

At 1602, the method includes determining if the virtual mouse input mode has been initiated. If the virtual mouse input mode has been initiated (YES at 1602), the method proceeds to 1604 where the method includes determining if the touch contact that satisfies the first criterion has been removed from a multi-touch input surface. It will be appreciated that the multi-touch input surface is included in a peripheral touch device in method 1600. If it is determined that the touch contact that satisfies the first criterion has not been removed from the multi-touch input surface (NO at 1604), the method returns to 1602. However, if it is determined that the touch contact that satisfies the first criterion has been removed from the multi-touch input surface (YES at 1604), the method proceed to 1606 where the method includes determining if the user interface presented on a display is in an engaged state. As one example, a click command may set the user interface in an engaged state. Moreover, a user may use satellite inputs to manipulate an object presented in the user interface in an engaged state in some embodiments.

If it is determined that the user interface is in an engaged state (YES at 1606), the method returns to 1602. It will be appreciated that cessation of a satellite contact may trigger termination of the engaged state. However, if it is determined that the user interface is in a disengaged state (NO at 1606), the method proceeds to 1608 where the method includes initiating a multi-touch input mode in a disengaged state. At 1610, the method includes outputting a touch contact position at or in close proximity to the position of the cursor. However in some embodiments step 1610 may not be included in method 1600.

FIG. 17 shows a method 1700 for transitioning between the multi-touch input mode and the virtual mouse input mode. Method 1700 may be implemented using the hardware and software components of the systems and devices described herein, and/or any other suitable hardware and software components. Specifically, method 1700 may be implemented via a computing system as described above in which the touch input device is a touch screen device or a peripheral device.

At 1702 the method determines whether the multi-touch input mode has been initiated. If it is determined that the multi-touch input mode has been initiated (YES at 1702), then the method advances to 1704, where it is determined whether the touch contact that satisfies the first criterion has been applied to a multi-touch input surface. It will be appreciated that the multi-touch input surface may be included in a peripheral touch device.

If it is determined that the touch contact that satisfies the first criterion has not been applied to the multi-touch input surface (NO at 1704), then the method returns to 1702. However, if it is determined that the touch contact that satisfies the first criterion has been applied to the multi-touch input surface (YES at 1704), then the method proceeds to 1706 where it is determined whether a user interface presented on a display is in an engaged state. If it is determined that the user interface presented on the display is in an engaged state (YES at 1706), then the method returns to 1702. If it is determined that the user interface presented on the display is not in an engaged state (NO at 1706), then the method advances to 1708, where the virtual mouse input mode is initiated in a disengaged state.

The above described methods and processes may be tied to a computing system, such as computing system 50 of FIG. 1.

Figure 18:
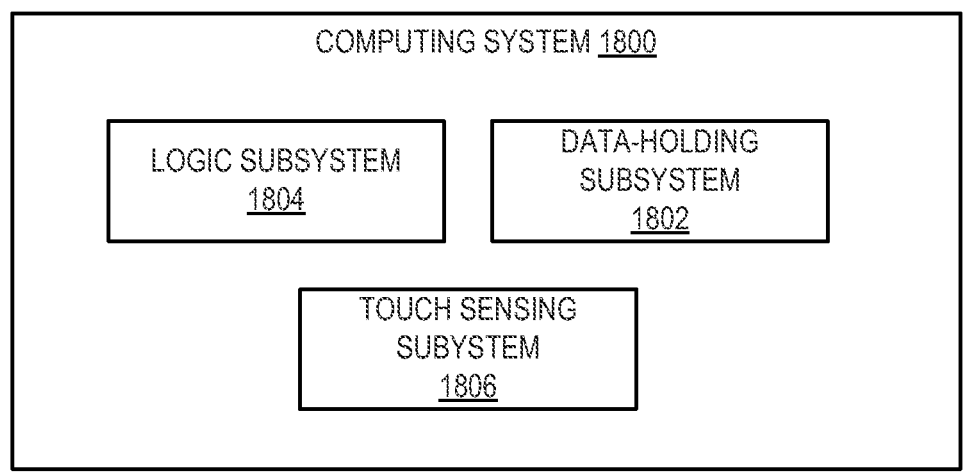
FIG. 18 shows a schematic representation of a computing system.

FIG. 18 schematically illustrates a computing system 1800 in a more general form. Computing system 50, or other computing systems compatible with this disclosure, may be configured as described with reference to computing system 1800. It is to be understood that any computing system may be used without departing from the scope of this disclosure.

Computing system 1800 includes data-holding subsystem 1802, logic subsystem 1804 and touch sensing subsystem 1806. Logic subsystem 1804 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firm are logic machines configured to execute hardware or firmware instructions. Furthermore the logic subsystem 1804 may be in operative communication with the touch sensing subsystem 1806.

Data-holding subsystem 1802 may include one or more physical devices configured to hold data and/or instructions executable by the logic subsystem to implement the herein described methods and processes. When such methods and processes are implemented, the state of data-holding subsystem 1802 may be transformed (e.g., to hold different data). Data-holding subsystem 1802 may include removable media and/or built-in devices. Data-holding subsystem 1802 may include optical memory devices, semiconductor memory devices, and/or magnetic memory devices, among others. Data-holding subsystem 1802 may include devices with one or more of the following characteristics: volatile, nonvolatile, dynamic, static, read/write, read-only, random access, sequential access, location addressable, file addressable, and content addressable. In some embodiments, Logic subsystem 1804 and data-holding subsystem 1802 may be integrated into one or more common devices, such as an application specific integrated circuit or a system on a chip. Additionally, the display 52, shown in FIG. 1, may be used to present a visual representation of data held by data-holding subsystem 1802.

The logic subsystem 1804 and the data-holding subsystem 1802 may be included in the touch input device 56 or the computing device 54 shown in FIG. 1. On the other hand, the logic subsystem 1804 and the data-holding subsystem 1802 may optionally include individual components that are distributed throughout two or more devices, which may be remotely located in some embodiments.

The touch sensing subsystem 1806 is configured to enable computing system 1800 to determine a size and a location of one or more contacts on a multi-touch input surface (e.g., multi-touch input surface 62, shown in FIG. 1). The touch sensing subsystem 1806 may be an optical sensing subsystem, a capacitive sensing subsystem, a resistive sensing subsystem, a mechanical pressure sensing subsystem, or any other suitable multi-touch capable input device.

It is to be understood that the configurations and/or approaches described herein are exemplary in nature, and that these specific embodiments or examples are not to be considered in a limiting sense, because numerous variations are possible. The specific routines or methods described herein ma represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A data-holding subsystem including one or more physical devices holding instructions executable by a logic subsystem, the instructions comprising:
   instructions to receive one or more touch-input messages reporting touch contacts recognized by a touch input device;
   instructions to in response to at least one of a size aspect of a diffuse touch contact reported by the one or more touch-input messages being greater than a size threshold, and a shape aspect of the diffuse touch contact matching a palm profile, initiate a virtual mouse input mode;
   instructions to, in the virtual mouse input mode, output a cursor position command corresponding to a position of a satellite touch input recognized at a control region offset from the diffuse touch contact;
   instructions to operate in a multi-touch input mode if no diffuse touch contacts reported by the one or more touch-input messages satisfy size or shape criteria; and
   instructions to, in the multi-touch input mode, output a multi-touch gesture command corresponding to each of one or more non-diffuse touch contacts.

2. The data-holding subsystem of claim 1, further comprising instructions to initiate a stylus input mode responsive to receiving a stylus signal.

3. The data-holding subsystem of claim 1, further comprising instructions to initiate a stylus input mode in response to a size aspect of the touch contact being below a threshold.

4. The data-holding subsystem of claim 3, further comprising instructions to output, in the stylus input mode, a stylus command corresponding to one or more of the received touch-input messages.

5. The data-holding subsystem of claim 1, further comprising instructions to initiate a stylus input mode in response to at least one of a shape aspect of the touch contact being a focused point contact and a shape aspect of the touch contact matching an ulnar profile.

6. The data-holding subsystem of claim 1, further comprising instructions to output a satellite mouse command corresponding to a satellite touch input in response to another satellite touch input recognized at a control region while in the virtual mouse input mode.

7. The data-holding subsystem of claim 6, wherein the satellite mouse command is one of a left click command, a right click command, and an auxiliary button command.

8. The data-holding subsystem of claim 6, where the satellite mouse command is one of a vertical scrolling command, an object scaling command, and a horizontal scrolling command.

9. The data-holding subsystem of claim 6, wherein the satellite mouse command triggers engagement of a user interface object presented on a display.

10. The data-holding subsystem of claim 9, wherein the engagement is sustained subsequent to removal of the touch contact reported by the one or more touch-input messages that satisfies the first criterion.

11. The data-holding subsystem of claim 1, further comprising instructions to ignore a satellite touch contact if that satellite touch contact is recognized outside of the control region.

12. The data-holding subsystem of claim 1, wherein the one or more touch-input messages are received from a peripheral touch device.

13. The data-holding subsystem of claim 1, wherein the one or more touch-input messages are received from a touch screen device.

14. The data-holding subsystem of claim 1, wherein output of the cursor position command is sustained subsequent to cessation of the virtual mouse input mode.

15. The data-holding subsystem of claim 1, wherein the multi-touch gesture command is at least one of an engage command, a disengage command, a pan command, a drag command, a zoom command, a rotate command, and a skew command.

16. A data-holding subsystem including one or more physical devices holding instructions executable by a logic subsystem, the instructions comprising:
- instructions to receive one or more touch-input messages reporting touch contacts recognized by a peripheral device;
- instructions to, in response to at least one of a size aspect of a diffuse touch contact reported by the one or more touch-input messages being greater than a size threshold, and a shape aspect of the diffuse touch contact matching a palm profile, initiate a virtual mouse input mode;
- instructions to, in the virtual mouse input mode, output a cursor position command corresponding to a position of a satellite touch input recognized at a control region offset from the diffuse touch contact while ignoring other touch inputs recognized outside of the control region;
- instructions to operate in a multi-touch input mode if no diffuse touch contacts reported by the one or more touch-input messages satisfy size or shape criteria; and
- instructions to, in the multi-touch input mode, output a multi-touch gesture command corresponding to each of one or more non-diffuse touch contacts.

17. The data-holding subsystem of claim 16, further comprising instructions to initiate a stylus input mode in response to a size aspect of the touch contact being below a threshold, and instructions to output a stylus command corresponding to one or more of the received touch-input messages while in the stylus input mode.

18. A computing device, comprising:
a touch screen display;
a logic subsystem operatively connected to the touch screen display; and
one or more physical devices holding instructions executable by the logic subsystem, the instructions comprising:
- instructions to receive one or more touch-input messages reporting touch contacts recognized by a touch screen display;
- instructions to, in response to at least one of a size aspect of a diffuse touch contact reported by the one or more touch-input messages being greater than a size threshold, and a shape aspect of the diffuse touch contact matching a palm profile, initiate a virtual mouse input mode;
- instructions to, in the virtual mouse input mode, output a cursor position command corresponding to a position of a satellite touch input recognized at a control region offset from the diffuse touch contact;
- instructions to operate in a multi-touch input mode if no diffuse touch contacts reported by the one or more touch-input messages satisfy size or shape criteria; and
- instructions to, in the multi-touch input mode, output a multi-touch gesture command corresponding to each of one or more non-diffuse touch contacts.

\* \* \* \* \*